(12) United States Patent
Li et al.

(10) Patent No.: US 7,373,394 B1
(45) Date of Patent: *May 13, 2008

(54) METHOD AND APPARATUS FOR MULTICAST CLOUD WITH INTEGRATED MULTICAST AND UNICAST CHANNEL ROUTING IN A CONTENT DISTRIBUTION NETWORK

(75) Inventors: Dan Li, Sunnyvale, CA (US); Arun Desai, Fremont, CA (US); Zheng Yang, Fremont, CA (US); Kenneth Mueller, II, Santa Barbara, CA (US); Stephen Morris, Harvard, MA (US); Dmitry Stavisky, Wayland, MA (US)

(73) Assignee: Cisco Technology, Inc., San Jose, CA (US)

( * ) Notice: Subject to any disclaimer, the term of this patent is extended or adjusted under 35 U.S.C. 154(b) by 870 days.

This patent is subject to a terminal disclaimer.

(21) Appl. No.: 10/610,173

(22) Filed: Jun. 30, 2003

(51) Int. Cl.
G06F 15/16 (2006.01)
H04L 12/56 (2006.01)

(52) U.S. Cl. ............... 709/219; 709/227; 709/230; 370/389

(58) Field of Classification Search ........ 709/217–219, 709/227–230; 370/431, 463, 389
See application file for complete search history.

(56) References Cited

U.S. PATENT DOCUMENTS

| | | | | |
|---|---|---|---|---|
| 5,056,085 | A | 10/1991 | Vu | 370/60 |
| 5,684,961 | A | 11/1997 | Cidon et al. | 395/200.15 |
| 6,006,264 | A | 12/1999 | Colby et al. | 709/226 |
| 6,078,590 | A | 6/2000 | Farinacci et al. | 370/432 |
| 6,111,941 | A | 8/2000 | Schreyer | 379/207 |
| 6,131,123 | A * | 10/2000 | Hurst et al. | 709/238 |
| 6,134,599 | A * | 10/2000 | Chiu et al. | 709/252 |
| 6,163,807 | A | 12/2000 | Hodgkinson et al. | 709/229 |
| 6,181,697 | B1 * | 1/2001 | Nurenberg et al. | 370/390 |
| 6,205,481 | B1 | 3/2001 | Heddaya et al. | 709/226 |
| 6,269,080 | B1 * | 7/2001 | Kumar | 370/236 |
| 6,331,983 | B1 | 12/2001 | Haggerty et al. | 370/400 |
| 6,421,706 | B1 * | 7/2002 | McNeill et al. | 709/204 |
| 6,718,361 | B1 | 4/2004 | Basani et al. | 709/201 |
| 6,748,447 | B1 * | 6/2004 | Basani et al. | 709/244 |
| 6,785,704 | B1 | 8/2004 | McCanne | 709/105 |
| 6,925,504 | B1 * | 8/2005 | Liskov et al. | 709/239 |
| 7,117,273 | B1 * | 10/2006 | O'Toole et al. | 709/239 |
| 2002/0040389 | A1 * | 4/2002 | Gerba et al. | 709/219 |
| 2002/0143951 | A1 * | 10/2002 | Khan et al. | 709/227 |
| 2003/0079027 | A1 * | 4/2003 | Slocombe et al. | 709/229 |
| 2003/0229549 | A1 * | 12/2003 | Wolinsky et al. | 705/27 |
| 2005/0188108 | A1 * | 8/2005 | Carter et al. | 709/239 |
| 2005/0283526 | A1 * | 12/2005 | O'Neal et al. | 709/223 |

* cited by examiner

OTHER PUBLICATIONS

Waitzman et al. "Distance Vector Multicast Routing Protocol" RFC 1075; Nov. 1988.*

*Primary Examiner*—Joseph E. Avellino
(74) *Attorney, Agent, or Firm*—BainwoodHuang

(57) ABSTRACT

An apparatus and method for defining content distribution paths in a content distribution network integrate unicast and multicast connections. Content engines in the content distributed network are organized into channels with a master content engine maintaining specific content. The content distribution network is further organized into a distribution hierarchy based on network topology and channel definitions, first by establishing unicast paths through the content distributed network and then by integrating multicast paths into the unicast hierarchy. The further organization of the content distribution network establishes distribution trees from the channel masters to the network edges.

13 Claims, 5 Drawing Sheets

METHOD AND APPARATUS FOR MULTICAST CLOUD WITH INTEGRATED MULTICAST AND UNICAST CHANNEL ROUTING IN A CONTENT DISTRIBUTION NETWORK

BACKGROUND

Computer networks such as the Internet allow computer systems to exchange content (e.g., data or information such as documents, web pages, files, database information, streams of audio and/or video data, or the like) in a variety of ways. For example, computer systems (e.g., client computer systems, server computer systems) exchange content over the computer network by using a suite of protocols collectively referred to as the World Wide Web. In a typical operation of the World Wide Web, a client computer system, configured with a web browser, requests content served by a web server computer system over the Internet. The web server transmits the requested content over the Internet to the requesting client computer system.

Client computer systems that require the ability to access content using the aforementioned techniques may be connected to a computer network at diverse geographic locations. In such situations, a producer, provider or other originator of the content may use a group of technologies, collectively called a content distribution network (CDN), to disseminate or distribute the content.

A CDN enables web content from an origin server to be distributed to other servers at various locations in the network for storage and access. A CDN typically includes a content distribution manager (CDM) to manage the CDN, at least one content router (e.g., operating as a load balancer) and one or more content engines that operate as servers (e.g., web servers) to serve content requested by content requests sent from client computer systems. The content router receives client requests for content, and using various content routing techniques, decides which content engine is to service those client requests. The content router then redirects the client requests to an appropriate content engine. The content engines are also called content servers, or alternatively, caching servers. A content engine that receives redirected requests from a client computer system typically operates to serve the requested content back to those client computer systems, though the content engine may perform further redirection techniques as well in some instances.

When a user requests a Web page, for example, that is part of the CDN, the CDN typically redirects the request from the origin server to a content engine that is closest to the user. This redirection may be based on a number of factors such as the geographic proximity of the requesting client to an available content engine containing the requested content, or on the specific content requested, or on load balancing considerations between multiple available content engines. The content engine delivers the cached content to the user. The CDN also communicates with the origin server to deliver any content that has not been previously cached.

As an example of the operation of a CDN, a user controlling a web browser operating on a client computer system may select a Uniform Resource Locator (URL) that references a specific portion of content served by the CDN. A domain name specified within the URL might generally reference the CDN itself, such as www.CDN.com and protocols such as the Domain Naming System (DNS) can initially direct that client content request to a content router associated with that CDN. Through various redirection techniques (e.g., Domain Naming System redirection and/or Hypertext Transport Protocol redirection), the content router that receives the client request for content can redirect this client request to an address of a specific content engine within the CDN based on the aforementioned routing criteria (e.g., the geographic location of the client providing the client content, load balancing considerations made between the various content engines, and so forth). A content engine that receives the redirected content request can then process this request to serve the requested content to the client computer system.

As explained above, a conventional CDN accelerates access to content on behalf of client computer systems that request the content by distributing the content among content engines distributed throughout a computer network. Rather than all client computer systems requesting the same content from a single origin server, individual client computer systems are able to obtain the requested content from a content engine that is "close" to the client and that locally stores the required content. This improves a client's performance with respect to access to the content for a number of reasons. The client computer system may be much closer in network terms (e.g., number of network hops) to the content engine as compared to the origin server. In addition, the data communications link from the client computer system to the content engine may be a high-speed connection while one or more data communications links (e.g., a satellite link) along the network path from the client computer system to the origin server may be relatively slow data communications links. As a result, the client computer system can access the content faster (i.e., can get better response) from the more local content engine than from the more distant or remote origin server. In addition, by having many content engines distributed throughout a computer network, the load, demand and bandwidth requirements of each content engine is generally reduced as each content engine needs to serve content to only certain client computer systems.

Various conventional techniques and mechanisms also exist for distributing the content from the origin server to the selection of content engines distributed through the computer network in order to accelerate access to the content by client computer systems. One technique for distributing content is the content channel. A content provider defines one or more "channels" to make content available through the CDN. Each channel contains a set of files that is typically expected to be accessed by the same set of users. For example, a channel may contain training videos intended to be used by sales people, or advertisements directed at an organization's customers. A subset of the content servers in the CDN is assigned to each channel. The content servers in the assigned subset are typically servers located conveniently with respect to the intended set of users of the channel.

Files in a channel are pre-positioned at the content servers assigned to that channel. Pre-positioning enables greater certainty of availability of the content to accessing users. The content servers assigned to the channel may be behind a slow link relative to the origin server, and the files themselves may be very large. Therefore, moving the content from the origin server to a content engine assigned to the channel can be time-consuming. Pre-positioning the content generally reduces delay when users attempt to access files. Pre-positioning content within content engines is especially important when the content is very large or in situations where there is a low speed connection between the origin server and the content engine that will cache or otherwise store the content for access by requesting client computer systems. By pre-positioning the content, client computer systems encounter minimal delays when requesting the content from the content engines.

Routing within the CDN may be further accelerated by creating an overlay network. An overlay network includes a collection of nodes placed at strategic locations in an existing network fabric, also referred to as a substrate network.

The overlay network further includes specified connections between the nodes in the collection of nodes. Together the collection of nodes and the specified connections implement a network abstraction on top of the substrate network. Routing is accelerated by selecting optimal nodes and connections. In a CDN, the overlay network includes the content engines and connections between the content engines. The connections are selected in order to optimize data transfer between the content engines.

SUMMARY OF THE INVENTION

Conventional techniques for distributing content from content provider computer systems, such as origin servers, to content engine computer systems (i.e., servers) suffer from a variety of deficiencies. Such deficiencies arise from the fact that conventional content distribution techniques do not integrate unicast and multicast data transmission in an overlay network. Unicast transmission, which means data transmission to only one receiver, is less efficient than multicast transmission, which means data transmission to more than one receiver. In a network, typically only a subset of nodes are multicast-enabled. Accordingly, some links between nodes are unicast and some are multicast. A successful overlay network, then, integrates unicast and multicast data transmission. Issues not addressed by conventional technology include organizing multicast replication, channel routing between multicast and unicast connections, multicast to unicast failover, unicast to multicast failover, multicast to multicast failover, multicast content security, multicast bandwidth control and Quality of Service (QoS). A network integrating unicast and multicast data transmission in an overlay network at the application layer addresses this issues and provides a faster and more efficient network.

Embodiments of the present invention significantly overcome the deficiencies described above and provide methods and apparatus for defining unicast content distribution paths with integrated multicast clouds. Embodiments of the invention operate to define unicast distribution paths that are efficient and selected based on factors such as relatively rapid data communications links existing between content engines, firewall conditions that may exist between content engines that allow one-directional communication only, and situations that involve a balancing of a number of child content engines that access content from a particular ancestor content engine within the network topology. Embodiments of the invention then define multicast clouds at groups of multicast enabled content engines integrated into the distribution paths. The system and method of the invention provide efficient data distribution through the tree structure further including multicast data transmission.

Generally, embodiments of the invention operate to create a distribution hierarchy in which multicast clouds are integrated. The multicast clouds are determined from network groups of multicast enabled content engines. Within a multicast cloud, at least one sender content engine distributes content via multicast transmission to a plurality of receiver content engines.

In operation, the system of the invention receives a network topology definition and at least one channel definition. The network topology provides the configuration of the content distributed network including the unicast and multicast capabilities of the content engines includes in the content distributed network. The channel definition provides a specification of which content engines are in the channel and a specification of the content to be carried in the channel as well as a selection of a root, or master, content engine. The system then uses a unicast content distribution path determination technique to establish a first portion of the distribution hierarchy, the unicast distributed paths portion within the channel. The system then searches the network topology for groups of multicast enabled content engines. Within each group of multicast enabled content engines, the system defines a sender and plurality of receivers. The system further provides the group with a multicast IP address. Upon receiving the multicast IP address, the group becomes a multicast cloud where the sender acquires content and multicast transmits the content using the multicast IP address to the receivers.

More specifically, embodiments of the invention provide methods and apparatus for establishing integrated unicast and multicast distribution in a channel routed network. One such method embodiment is implemented in a content distributed network, and includes the step of receiving at a path/cloud manager a network topology definition defining at least one hierarchical interconnection of network groups, each network group having at least one content engine. The path/cloud manager then receives a channel definition including a selection of a plurality of content engines to distribute content within the content distribution network, where the plurality of content engines in the channel definition are selected from content engines within the network groups defined in the network topology definition. The path/cloud manager then detects an assignment of a root content engine within the channel definition. Then, the path/cloud manager applies a first content distribution path determination technique to the network topology definition in relation to the channel definition to determine a set of unicast content distribution paths in the content distribution network for unicast distribution of content from the root content engine to the plurality of content engines defined in the channel definition. Then, the path/cloud manager applies a second content distribution path determination technique to the network topology definition in relation to the channel definition to determine a set of multicast content distribution paths in the content distribution network for multicast distribution of content in a subset of the plurality of content engines defined in the channel definition. This method establishes a distribution hierarchy for a content distributed network that integrates unicast and multicast transmission and channel routing to achieve efficient distribution of channel content.

In an alternative embodiment of the invention, the step of the path/cloud manager applying the second content distribution path determination technique further comprises the step of selecting one of the plurality of multicast enabled content engines to be a multicast sender at each network group having a plurality of multicast-enabled content engines. The path/cloud manager then defines the other multicast-enabled content engines of the plurality of multicast-enabled content engines to be multicast receivers. The path/cloud manager then provides one of a set of Internet Protocol addresses to each of the plurality of multicast-enabled content engines for multicast advertisement and multicast data traffic within the multicast cloud. This embodiment establishes at least one multicast cloud in which the sender acquires channel content and distributes the content to a plurality of receivers using multicast transmission which eases network congestion.

In a further alternative embodiment of the invention, the path/cloud manager provides an encryption key to each of the plurality of multicast-enabled content engines to secure data communication within the multicast cloud. Typically, the content engines in a multicast cloud reside behind a firewall but the encryption key provides further data protection to the multicast cloud.

In another alternative embodiment of the invention, the path/cloud manager selects a sender content engine within a multicast cloud by first selecting one of the content engines of the plurality of multicast-enabled content engines. The path/cloud manager then determines whether the selected content engine is on a topological location path toward the root content engine. The path/cloud manager then confirms that the selected content engine is capable of receiving data in a multicast mode and sending data in a multicast mode. If the selected content engine is on a topological location path toward the root content engine and is capable of receiving and sending data in multicast, then the path/cloud manager defines the selected content engine to be the multicast sender in the particular multicast cloud. If the selected content engine is not on a topological location path toward the root content engine and is not capable of receiving and sending data in multicast, then the path/cloud manager selects another content engine from the plurality of multicast-enabled content engines and repeats the steps of determining whether the selected content engine is on a topological path toward the root content engine and whether the selected content engine is multicast enabled and repeats these steps until the path/cloud manager finds an appropriate content engine. This provides an optimized selection process for the selection of the multicast sender within a multicast cloud.

In another alternative embodiment of the invention, the path/cloud manager receives a second channel definition including a selection of a second plurality of content engines to distribute second content within the content distribution network. The second plurality of content engines in the second channel definition are selected from the content engines within the network groups defined in the network topology definition. The path/cloud manager detects an assignment of a second root content engine within the second channel definition. The path/cloud manager applies a first content distribution path determination technique to the network topology definition in relation to the second channel definition to determine a second set of unicast content distribution paths in the content distribution network for unicast distribution of content from the second root content engine to the second plurality of content engines defined in the second channel definition. The path/cloud manager then applies a second content distribution path determination technique to the network topology definition in relation to the second channel definition to determine a second set of multicast content distribution paths in the content distribution network for multicast distribution of content in a second subset of the second plurality of content engines defined in the second channel definition. This embodiment enables the integration of unicast and multicast data transmission in a content distributed network having a plurality of channels.

In a further alternative embodiment of the second distribution path determination technique described above, the path/cloud manager establishes a multicast cloud at each network group included in the second channel definition having a plurality of multicast-enabled content engines. If a multicast cloud included in the second channel definition is also included in another channel definition, the path/cloud manager provides the multicast cloud with a second set of Internet Protocol addresses for multicast communication of second content from the second channel definition. The separate IP addresses enable an individual multicast cloud to distribute data in a plurality of channels.

Another embodiment of the invention provides a method for a multicast enabled content engine in a content distributed network to acquire multicast transmitted data. The multicast enabled content engine listens for a multicast advertisement from a multicast sender in a multicast cloud with the multicast enabled content engine. The multicast enabled engine then examines the multicast advertisement for a multicast transmission time. If there is a time interval before the multicast transmission time, the multicast enabled content engine sends a unicast transmission request to the multicast sender. If there is no response to the unicast transmission request, the multicast enabled content engine requests a multicast transmission from a second sender, a backup sender or a different sender, either multicast or unicast, in the multicast cloud. This embodiment enables channel content to be distributed within a multicast cloud.

In an alternative embodiment of the multicast enabled content engine, the content distributed network has a first channel and a second channel and the multicast enabled content engine listens for a first channel multicast advertisement for transmission information about the first channel and listens for a second channel multicast advertisement for transmission information about the second channel. In listening for the first channel multicast advertisement, the multicast enabled content engine monitors a first set of Internet Protocol addresses associated with the first channel. In listening for the second channel multicast advertisement, the multicast enabled content engine monitors a second set of Internet Protocol addresses associated with the second channel. The multicast enabled content engine is able to receive multicast transmitted data from a plurality of content engines.

In another embodiment of the invention, a method of failover from a first sender to a secondary content forwarder is provided in a multicast cloud in a content-distributed network by monitoring at the second sender the multicast transmission Internet Protocol address for data from the first sender. The secondary content forwarder transmits periodic protocol calls to the first sender. If the secondary content forwarder receives no transmissions at the Internet Protocol address from the first sender for a pre-defined period and if the first sender does not respond to at least one protocol call, the secondary content forwarder claims the role of first sender to propagate data in the multicast cloud. This method provides failover protection to an individual multicast cloud.

In another embodiment of the invention, a multicast-enabled content engine in a content distribution network includes an interface to receive data transmissions from the content distribution network, a memory and a controller coupled to the memory and the interface. The controller is configured to operate with the memory to monitor the interface for multicast transmission information. The controller examines the multicast transmission information for a multicast transmission advertisement and accepts multicast data transmissions from the content distribution network. The controller further generates a unicast data request when multicast data transmission from the content distribution network is delayed or failed. The controller transmits the unicast request over the content distribution network and then accepts a unicast data transmission transmitted over the content distribution network in response to the unicast request. This system enables the operation of the multicast cloud in the content distributed network.

In an alternative embodiment of the multicast content engine, the multicast content engine is included in a first channel and a second channel of the content distribution network. The controller examines the multicast transmission information for a first multicast transmission advertisement from the first channel and a second multicast transmission advertisement from the second channel. The controller accepts first multicast data transmissions over the first channel and second multicast data transmissions over the second channel. The multicast content engine of this embodiment is able to carry content of more than one channel.

Another embodiment of the invention is a multicast cloud in a content distribution network including a sender content engine in communication with the content distribution network. The sender content engine is included in a multicast-enabled channel in the content distribution network where the sender content engine is on a topological location path toward a content source of the multicast enabled channel. The sender content engine is multicast-enabled and sends content received over the multicast-enabled channel. The multicast cloud further includes a plurality of receiver content engines in communication with the sender content engine. The plurality of receiver content engines are in a same topological location with the sender content engine where the plurality of receiver content engines receive the content from the sender content engine. The multicast cloud can be integrated into a unicast distribution hierarchy because the sender is able to receive unicast content and then distribute the content using multicast transmission.

In an alternative embodiment of the multicast cloud, one of the plurality of receiver content engines is a secondary sender content engine to propagate data in the multicast cloud when the sender fails. This provides the multicast cloud with failover protection.

In a further embodiment of the multicast cloud, the multicast cloud is included in a second multicast-enabled channel in the content distribution network. The sender content engine is included in the second channel, is on a topological location path toward a second content source of the second multicast-enabled channel, and is enabled to send second content received over the second multicast-enabled channel. The plurality of receiver content engines are configured to receive the second content from the sender content engine. The multicast cloud in this embodiment is able to distribute content from a plurality of channels.

Another embodiment of the present invention is a content distributed network including multicast clouds where the content distributed network includes a plurality of servers including multicast servers and unicast servers. The plurality of servers are divided into topological locations. At each topological location having a plurality of multicast servers, at least one multicast server is defined as a sender and the other multicast servers are defined as receivers to establish a multicast cloud. At least one multicast-enabled channel includes a selection of the plurality of servers and at least one multicast cloud. The content distributed network further includes a content distribution manager in communication with the plurality of servers. The content distribution manager manages content to be propagated through the at least one multicast-enabled channel. The content distributed network has efficient content distribution through integrated unicast and multicast transmission of channel content.

An alternative embodiment of the content distribution network includes a first multicast-enabled channel and a second multicast-enabled channel. The first multicast-enabled channel has a first selection of the plurality of servers and at least one multicast cloud. The second multicast-enabled channel has a second selection of the plurality of servers. The content distribution manager manages first content to be propagated through the first multicast-enabled channel and second content to be propagated through the second multicast-enabled channel. The content distributed network distributes content through a plurality of channels using integrated unicast and multicast transmission of channel content.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

An apparatus and method for defining content distribution paths in a content distribution network integrate unicast and multicast connections. Content engines in the content distributed network are organized into channels with a master content engine maintaining specific content. The content distribution network is further organized into a distribution hierarchy based on network topology, first by establishing unicast paths through the content distributed network and then by integrating multicast paths into the unicast hierarchy. The further organization of the content distribution network establishes distribution trees from the channel masters to the network edges providing efficient content distribution.

Figure 1:
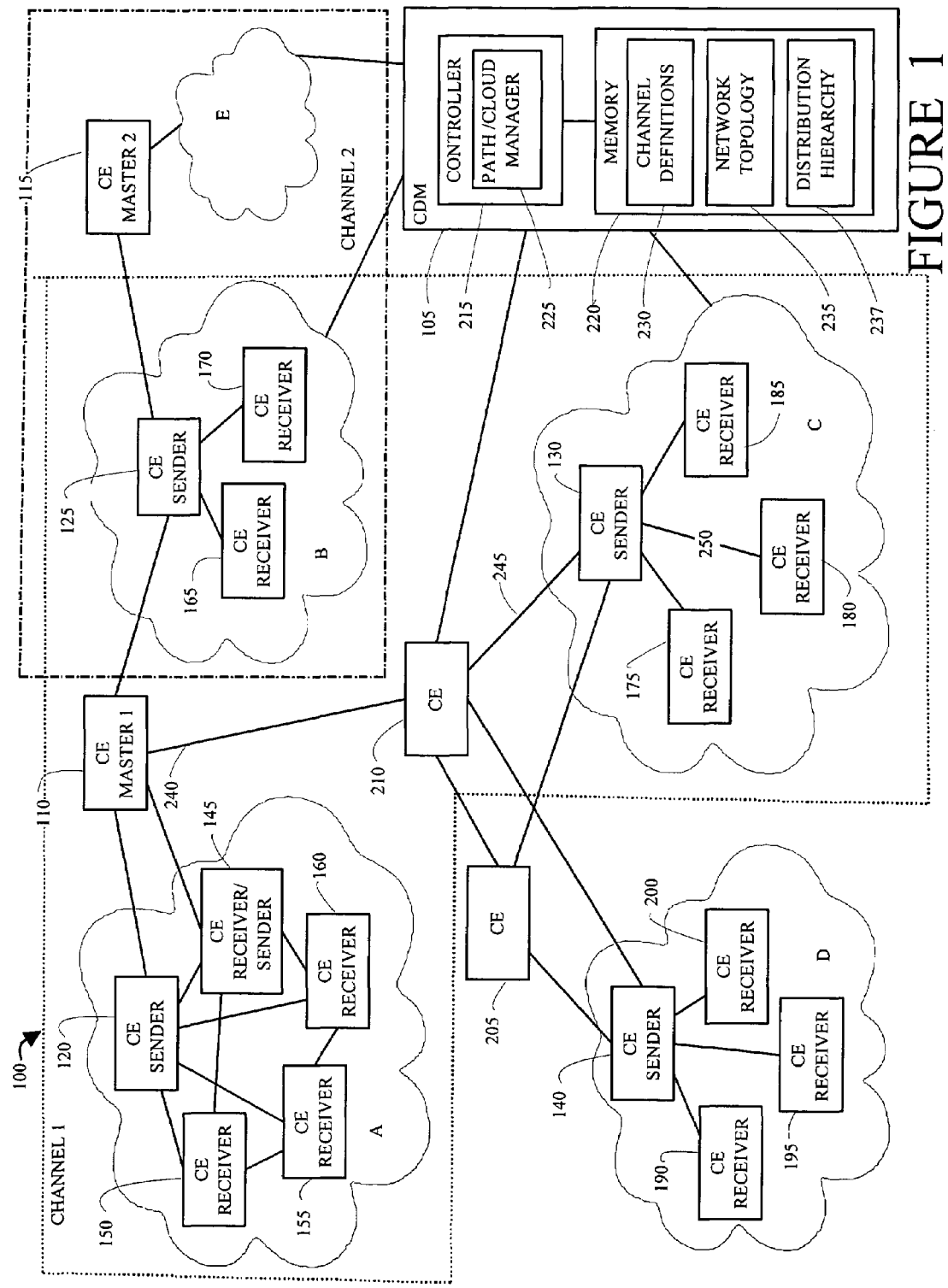
FIG. 1 is a block diagram of a content-distributed computer network including integrated multicast and unicast channel routing according to the principles of the present invention.

FIG. 1 shows an example of a content distributed network 100 having integrated multicast and unicast channel routing according to principles of the invention. The content distributed network 100 includes a content distribution manager 105 and a plurality of content engines 110, 115, 120, 125, 130, 140, 145, 150, 155, 160, 165, 170, 175, 180, 185, 190, 195, 200, 205, 210. The content distributed network 100 is a network in which the connections shown in FIG. 1 are merely an exemplary subset of connections presented to illustrate the invention. Each content engine in the content distributed network 100 caches content that the content engine serves in response to requests for content.

Selected content engines in the content distribution network 100 are organized into a plurality of groups of content engines, group A, group B, group C, group D and group E. The groups are based on network configuration, described below. The content engines in each group (A, B, C, D and E) are multicast-enabled and can communicate over the connections in the group using multicast data transmission. Each group (A, B, C, D and E) has at least one content engine that is a sender 120, 125, 130, 140 of multicast data transmissions and at least one content engine that is a receiver 145, 150, 155, 160, 165, 170, 175, 180, 185, 190, 195, 200 of multicast data transmissions. Group A has a receiver 145 that is a backup sender. Receiver 145 takes over as sender in group A if sender 120 fails. The content engines in group E are not shown due to space considerations. As will be explained below, each group of content engines is a multicast cloud.

The content distributed network 100 further includes content engines Master 1 110, and Master 2 115 and content engines 205, 210. Master 1 and Master 2 are root content engines for Channel 1 and Channel 2 respectively. As illustrated, content engines 110, 115, 205, 210 are not part of groups A, B, C, D or E.

The content distribution manager (CDM) 105 is a computerized device that manages the content distribution network 100. The content distribution manager 105 includes a controller 215 and a memory 220. The controller 215 includes a path/cloud manager 225. The memory 220 stores channel definitions 230 and a network topology definition, also referred to simply as the network topology 235. The memory 220 also stores distribution hierarchy 237. The channel definition 230 and the network topology 235 are provided by a network administrator, for example. The path/cloud manager 225 produces the distribution hierarchy 237 from the channel definition 230 and the network topology 235 as will be explained below. In alternative embodiments of the invention, the path/cloud manager 225 and stored channel definitions 230 and network topology 235 are part of a computerized device connected to the content distributed network 100 but separate from the content distribution manager 105.

In order to effectively distribute data through the content distributed network 100, the content distributed network 100 is organized into a distribution hierarchy 237 having a plurality of integrated aspects. A first aspect of the hierarchy involves organizing the content engines in the content distributed network 100 into channels. A second aspect of the hierarchy involves developing an overlay network of unicast distribution paths in the content distribution network 100. Finally, a third aspect of the hierarchy involves developing the overlay network further to include multicast transmission distribution in the form of multicast clouds.

In the first aspect of the distribution hierarchy 237, in the present example embodiment of the invention, the content distributed network 100 is organized into Channel 1 and Channel 2. The number of channels is merely exemplary. Typically there are many channels in a content distributed network. As explained above in the background, a channel is a selection of content engines in a network provided with particular content to be stored and distributed by those selected content engines. In other words, the channel is a mechanism to pre-position files for efficient access by requesting devices (not shown) connected to the content distributed network 100. A network administrator or other user of the content distributed network 100 provides a channel definition 230 including the selection of content engines in the channel and a channel content specification. Channel content comes from origin servers (not shown). In each channel, one content engine is selected to be the master. The channel definition 230 typically specifies which content engine will have the role of master for a given channel. In alternative embodiments of the invention, the path/cloud manager 225 selects the content engine that will act as master. The master content engine maintains a master set of content files and propagates changes to the master set of content files to the other content engines in the channel.

As shown in FIG. 1, subsets of the content engines in the content distributed network 100 are grouped into a first channel, Channel 1, and a second channel, Channel 2, according to channel definitions 230 received from the network administrator and stored in the CDM 105. The channel definitions 230, in this example embodiment, include a designation of the master as well as a specification of content engines included in the channel and a specification of the content to be carried in the channel. Accordingly, as defined by a first channel definition 230, Channel 1 includes Master 1, multicast cloud A, multicast cloud B, multicast cloud C and content engine 210 and carries a first set of content (not shown). Channel 2 includes Master 2, multicast cloud B and multicast cloud E and carries a second set of content (not shown). As illustrated in FIG. 1, a multicast cloud can belong to more than one channel and the mechanism for accomplishing this will be explained below. An individual content engine may also belong to more than one channel.

Data is efficiently propagated through hierarchical data structures such as trees, and, as such, the remaining two aspects of the distribution hierarchy involve developing a hierarchical overlay network including the channels and based on the network topology 235. Accordingly, the second aspect of the distribution hierarchy in the content distributed network 100 is a hierarchy of unicast distribution paths connecting the content engines in the content distribution network 100. To accomplish the second aspect of the distribution hierarchy in the content distribution network 100, the CDM 105 uses the network topology definition 235. In a first embodiment of the invention, the network administrator provides the network topology definition 235. In a second embodiment of the invention, the path/cloud manager 225 executes a conventional network discovery process to obtain the network topology.

The network topology definition 235 defines at least one hierarchical interconnection of network groups. Each network group includes at least one content engine. For example, each of the groups (A, B, C, D and E) in the content distributed network 100 is a network group. Content engine 205 and content engine 210 are also network groups. Where there are a plurality of content engines in a group, the content engines within the network group are well-connected to each other, meaning that there are no firewalls between any of the content engines in the network group. Further, each content engine in the network group has similar connectivity to the portions of the network external to the network group as every other content engine in the group. The network topology definition 235 also includes information about the content engines in the content distributed network 100 such as unicast and multicast capability. In alternative embodiments of the invention, the network topology definition 235 includes other information about the network 100 such as connection speed.

In developing the second aspect of the distributed hierarchy, the path/cloud manager 225 produces a set of unicast distribution paths within each channel that enable the content distribution network 100 to distribute content. A unicast distribution path is a set of connections between a master, such as Master 1, through selected content engines in a channel, such as Channel 1, to the network edge where data transmission over the connections is accomplished using unicast data transmission. An example distribution path is the set of connections 240, 245, 250 between Master 1 and content engine 180. The path/cloud manager 225 accesses the channel definitions 230 and the network topology 235 and applies a content distribution path determination algorithm to produce an optimal set of distribution paths for distribution of content from the masters 110, 115, also referred to as the root content engines, to each of the remaining non-root, but selected, network groups (i.e., network groups containing one or more of the non-root selected content engines) in Channel 1 and Channel 2.

Generally, to determine the optimized unicast data distribution paths, the path/cloud manager 225 develops a distribution path or data link from each non-root network group back to the selected root. The path/cloud manager 225 is able to define an optimized unicast data distribution path (i.e., a set of unicast links) between the non-root network group and the root by including all selected network groups interconnected by a path of data links within the network topology 235 beginning at a non-root network group and extending to the common ancestor, the master.

The specific techniques that the path/cloud manager 225 applies to determine the unicast distribution paths are not the subject of the present invention. An example technique of unicast content distribution path determination is disclosed in U.S. patent application Ser. No. 10/602,971, filed Jun. 23, 2003 and entitled "Methods and Apparatus for Performing Content Distribution in a Content Distribution Network." It is to be understood that various tree-walking algorithms can be used in embodiments of the invention to traverse the network topology to find ancestor nodes, top-level nodes, and the like. As an example, various N-ary tree manipulation and traversal algorithms that use prefix, postfix and infix tree walking techniques could be utilized by the invention to traverse the network topology and or distribution tree(s) associated with selected nodes in order to determine, for example, if non-root and root network groups shared a common ancestor network group.

Once embodiments of the invention produce the set of unicast content distribution paths, the distribution paths can be used for the dissemination of content to each of the selected network groups in Channel 1 and Channel 2 for further dissemination within those groups to the respective selected content engines. The distribution paths create tree structures within Channel 1 and Channel 2. The trees have tiers. The top tier, Tier 0, includes the masters. The next tier (Tier 1) accesses the master directly for information. The tier below the first tier (Tier 2) accesses Tier 1 for information and so on. In Channel 1, Master 1 is Tier 0 and group A, group B and content engine 210 are in Tier 1. Group C is in Tier 2. Channel 2 has Master 2 in Tier 0 and includes group B and group E in Tier 1. The tiered hierarchy makes communication of changes to the content carried by the channels more efficient than direct communication to each network group from the master. For improved data distribution efficiency, however, multicast data transmission is integrated into the content distributed network 100.

The third aspect of the distribution hierarchy and the focus of the present invention is the integration of multicast distribution into the unicast network overlay established above. The third aspect of the distribution hierarchy in the content distribution network 100 establishes a plurality of multicast clouds (A, B, C, D, E) in order to implement multicast data delivery in the distribution hierarchy. In the content distributed network 100, some content engines are multicast-enabled and data communication among them can be accomplished using multicast data transmission. The network topology definition 235 contains information about groups of content engines and multicast capabilities of the individual content engines within the groups. For example, groups A, B, C, D and E are groups of multicast-enabled content engines.

In developing the third aspect of the distribution hierarchy, the path/cloud manager 225 processes the channel definitions 230 and the network topology definition 235 to find the groups of multicast content engines and to create multicast clouds from the groups of multicast content engines.

Figure 2:
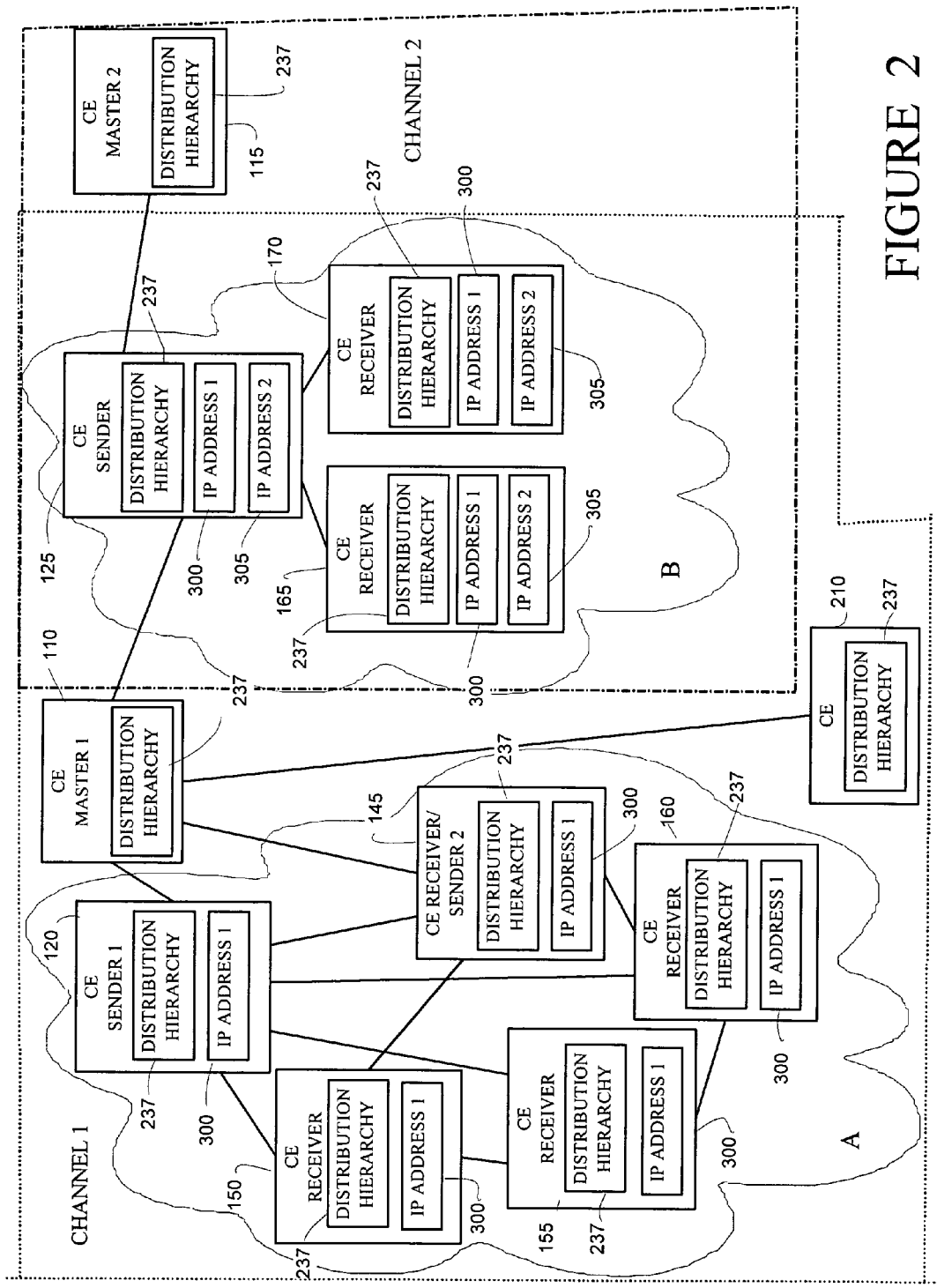
FIG. 2 is a block diagram of selected elements of the content distributed computer network of FIG. 1 illustrating multicast clouds.

FIG. 2 shows selected network groups of the content distributed network 100 of FIG. 1 to illustrate multicast clouds. Master 1 and Tier 1 of Channel 1 are shown where Tier 1 has group A, group B and content engine 210. Part of Channel 2 is shown including Master 2 and group B. Each content engine 110, 115, 120, 125, 125, 145, 150, 155, 160, 165, 170, 210 in Channel 1 and Channel 2 has a copy of the distribution hierarchy 237. The content engines 120, 145, 150, 155, 160 in group A have a first set of multicast IP addresses 300, IP address 1, for Channel 1 multicast data transactions. The content engines 125, 165, 170 in group B have a second set of multicast IP addresses 305, IP address 2, as well as the first set of multicast IP addresses 300. Group B uses IP address 2 for Channel 2 multicast data transactions and IP address 1 for Channel 1 multicast data transactions.

Using group A as a representative multicast cloud, each content engine 120, 145, 150, 155, 160 is multicast-enabled, or multicast "aware" meaning that the content engine is capable of listening for, transmitting and receiving multicast data transmissions. Based on the network topology definition 235, the path/cloud manager 225 selects a content engine from among the available content engines 120, 145, 150, 155 in group A to be the sender 120 and defines the remaining multicast content engines 145, 150, 155, 160 to be receivers. In alternative embodiments of the invention, the path/cloud manager 225 selects a plurality of content engines within a group to be senders. The sender is typically selected on the basis of proximity in network terms to the master. If group A were further down the distribution hierarchy, the sender selection would be based on proximity in network terms to a next ancestor in the data distribution path to the master 110. The path/cloud manager 225 provides one of each of the set of multicast IP addresses 300 to each of the content engines in group A for the multicast data transmissions of Channel 1 content. At this point, group A is a multicast cloud capable of acquiring Channel 1 content at the sender 120. The sender 120 multicast transmits the Channel 1 content to the receivers 145, 150, 155, 160 as will be explained below. Groups B, C, D, and E are similarly formed into multicast clouds B, C, D and E respectively. For multicast clouds belonging to more than one channel, such as multicast cloud B, the path/cloud manager 225 provides an IP address for each channel. Accordingly, multicast cloud B has the first set of IP addresses 300 for Channel 1 transmissions and the second set of IP addresses 305 for Channel 2 transmissions.

After the path/cloud manager 225 completes its examination of multicast enabled content engines in the content distribution network 100, the path/cloud manager 225 provides the distribution hierarchy 237 to all the content engines in the content distribution network 100.

In operation, Master 1 acquires the content to be distributed through Channel 1 and Master 2 acquires the content to be distributed through Channel 2. As described above, the content comes from origin servers that are not shown in FIG. 1. Master 1 receives requests for content from the first tier of content engines in its distribution hierarchy, that is, Master 1 receives requests from multicast cloud A, multicast cloud B and content engine 210. The senders 120, 125 of multicast cloud A and multicast cloud B request the data from master 1. Master 1 is not multicast enabled in this example embodiment of the invention. Master 1 responds with unicast transmissions to each requesting content engine 120, 125, 210. In one embodiment of the invention, Master 1 gives priority to those content engines that are multicast enabled. So, where content engine 210 is not multicast enabled, master 1 gives priority to content engine 120 and content engine 125.

Inside multicast cloud A, the sender 120 prepares to transmit a multicast transmission of content received from Master 1. The sender 120 transmits, using multicast IP address 1, a content transmission time to the receivers 145, 150, 155, 160. At the content transmission time, the sender transmits a multicast message of Channel 1 content to the receivers 145, 150, 155, 160 also using multicast IP address 1. The receivers 145, 150, 155, 160, having been informed of the transmission time by the sender 120, listen for and receive the multicast message of Channel 1 content.

Master 2, in the meantime, sends out a transmission of content of Channel 2 to multicast cloud B in response to a request from the sender 125. Inside multicast cloud B, the sender 125 transmits, using multicast IP address 1, a first content transmission time (e.g. "transmitting in five minutes") to the receivers 165, 170 and, using multicast IP address 2, a second content transmission time to the receivers 165, 170. At the first content transmission time, the sender 125 multicasts a message of Channel 1 content to the receivers 165, 170 using multicast IP address 1. At the second content transmission time, the sender 125 multicasts a message of Channel 2 content to the receivers 165, 170.

The receivers 165, 170, having been informed of the content transmission times, listen for and receive the multicast messages of Channel 1 and Channel 2 content.

A receiver, for example, receiver 165, can optionally request a unicast transmission of channel content from the sender 125. There are a number of circumstances in which a receiver might make this request. For example, the receiver 165 may not have received the multicast transmission due to a network error or some other error, or the receiver 165 was busy with some other transaction, or the content transmission time not acceptable. After receiving the unicast transmission request, the sender 125 makes one of two possible responses. First the sender 125 may respond with a message to the receiver 165 to wait for the multicast transmission or the sender 125 may respond with a unicast transmission of the requested channel content. If the receiver 165 receives a wait response from the sender 125, the receiver 165 has the option of making a unicast request of some other content engine in the content distributed network 100. For example, content engine 210 is a unicast forwarder in Channel 1. The receiver 165 has the option of requesting a unicast transmission of Channel 1 content from the content engine 210. The receiver 165 may alternatively request a unicast transmission from another multicast sender in Channel 1 such as master 110 or receiver 170 because the multicast senders are also unicast-enabled. Since every content engine in the content distributed network 100 has a copy of the distribution hierarchy 237, every content engine knows its hierarchical ancestors and its tier, and therefore knows which content engines probably have the desired content. Typically, in a content distributed network, there are many unicast forwarders and some number of multicast senders.

In alternative embodiments of the invention, individual content engines may belong to more than one multicast cloud and accordingly to more than one channel as well. In a further alternative embodiment of the invention, a multicast cloud, such as multicast cloud A, has failure protection. Multicast cloud A has a backup sender, sender 145, that takes over the tasks of the sender 120 if the sender 120 fails. In a further alternative embodiment of the invention, the path/cloud manager is able to detect failure of distribution paths and is able to instantiate alternative distribution paths in response to detecting failed paths.

Figure 3:
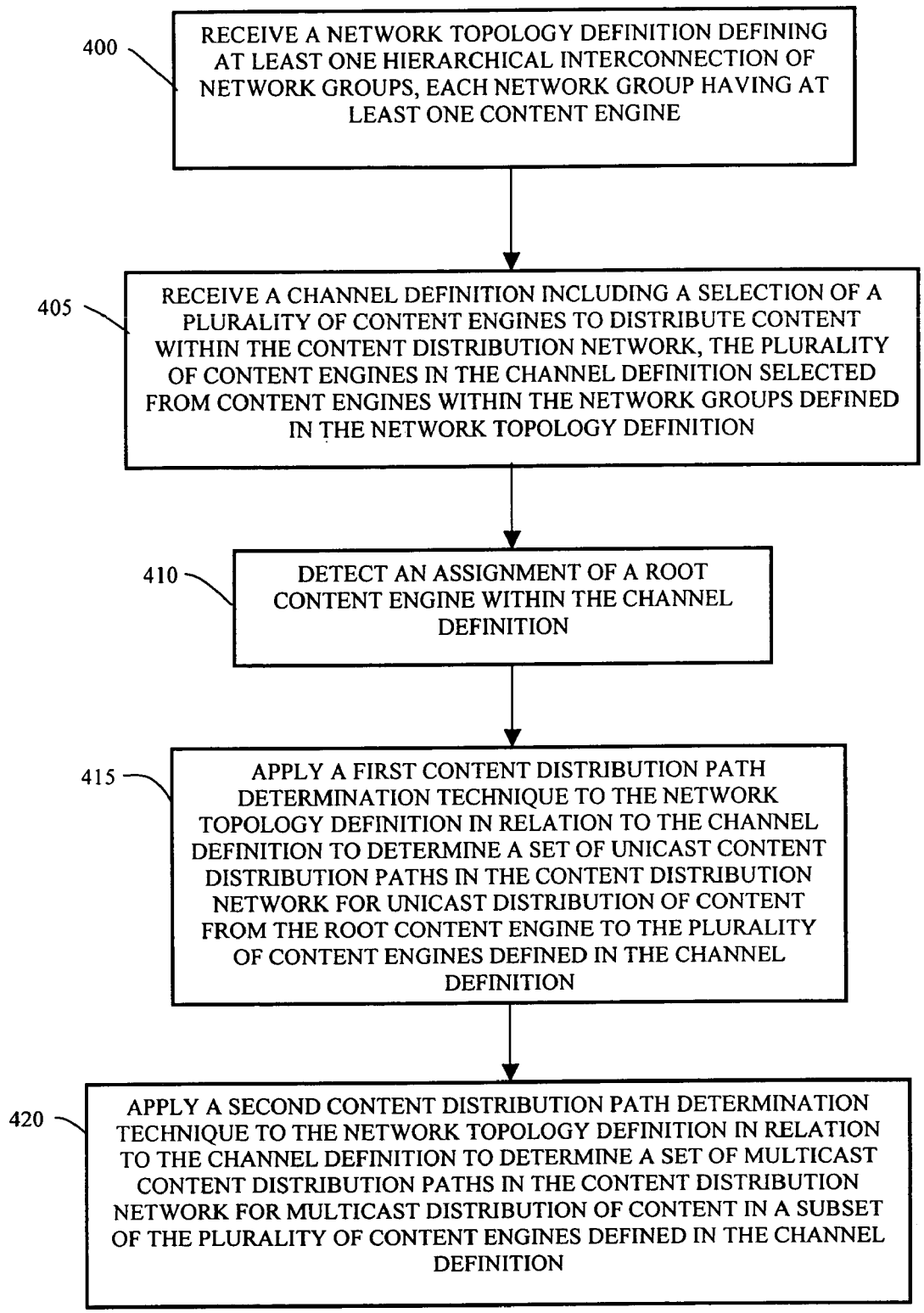
FIG. 3 is a flow chart of the process of establishing a distribution hierarchy for content within the content distribution network of FIG. 1.

FIG. 3 is a flow chart of the process of the path/cloud manager 225 establishing the distribution hierarchy 237, including multicast transmission, for distributing content within the content distribution network 100.

At step 400, the path/cloud manager 225 receives the network topology definition 235 defining at least one hierarchical interconnection of network groups, each network group having at least one content engine. The network groups include multicast cloud A, multicast cloud B, multicast cloud C, multicast cloud D, multicast cloud E; and content engines 205, 210. The network topology definition 235 also includes information about the unicast and multicast capabilities of the content engines in the content distributed network 100. In this present example embodiment of the invention, the network administrator provides the network topology definition 235 to the path/cloud manager 225.

At step 405, the path/cloud manager 225 receives a channel definition 230 from the network administrator. The channel definition 230 includes a selection of content engines that are to distribute specified content within the content distribution network 100. The content engines in the channel definition are selected from content engines within the network groups provided in the network topology definition 235. The channel definition 230 further includes a description of the specified content to be carried in the channel. This description is referred to as the content specification.

At step 410, the path/cloud manager 225 detects an assignment of a root content engine, also referred to as the master, for example master 1, within the channel definition 230. The channel definition 230, in addition to carrying a selection of content engines and a content specification, also contains a directive as to which content engine is to have the role of the master. The master, as described above, acquires the specified content from origin servers and then distributes the content to the other content engines in the channel in response to requests from the other content engines.

At step 415, the path/cloud manager 225 applies a first content distribution path determination technique to the network topology definition 235 in relation to the channel definition 230 to determine a set of unicast content distribution paths in the content distribution network 100 for unicast distribution of content from the root content engine to the rest of the content engines defined in the channel definition 230. As described above, various conventional techniques are available to traverse the network topology 235 in order to develop sets of unicast distribution paths. In this step, a tree of unicast distribution paths are determined within the channel. The distribution paths are optimized paths between content engines in the channel. The tree of unicast distribution paths are a first portion of the distribution hierarchy 237.

At step 420, the path/cloud manager 225 applies a second content distribution path determination technique to the network topology definition in relation to the channel definition to determine a set of multicast content distribution paths in the content distribution network for multicast distribution of content in a subset of the plurality of content engines defined in the channel definition. In the second content distribution path determination technique, the path/cloud manager 225 examines the network topology 235 for groups of multicast enabled content engines. The multicast enabled content engines are already included in the distribution hierarchy 237 through the unicast distribution paths determined in step 415. The second content distribution path determination technique incorporates the multicast capabilities of the multicast enabled content engines into the distribution hierarchy 237 by establishing multicast clouds as described below with regard to FIG. 4.

Figure 4:
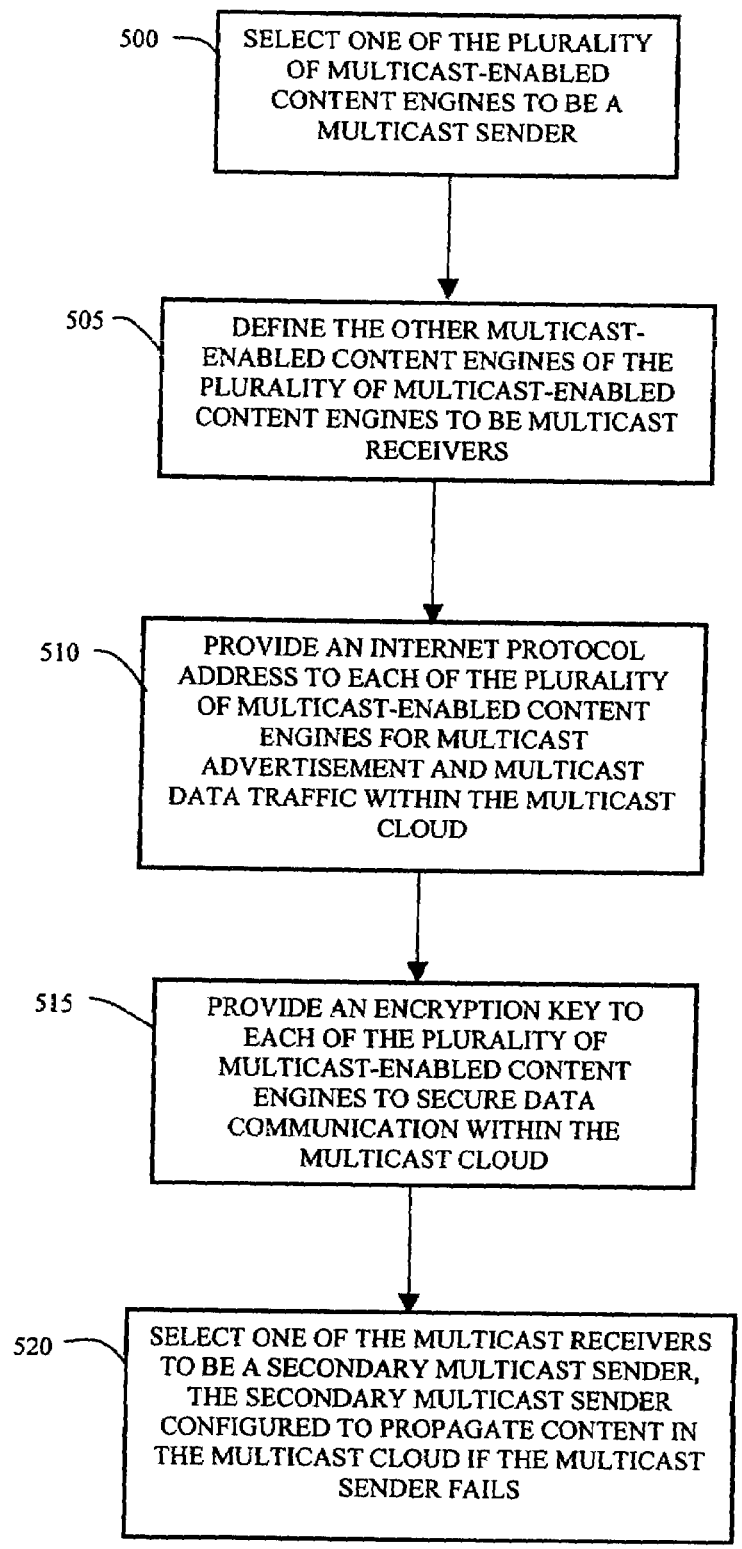
FIG. 4 is a flow chart of the process of establishing multicast clouds in the content distribution network of FIG. 1.

FIG. 4 is a flow chart of the process the path/cloud manager 225 in establishing multicast clouds in the content distribution network 100.

At step 500, the path/cloud manager 225 selects one of the plurality of multicast-enabled content engines in the multicast cloud, for example, multicast cloud A, to be a multicast sender 120. As mentioned above, in alternative embodiments of the invention, there may be a plurality of multicast senders within a cloud. The path/cloud manager 225 may use one or more factors in selecting the sender 120. For example, the path/cloud manager 225 may select the sender 120 based on network topology (e.g. the sender closest in network terms to master 1) and further considering the speed and capacity of the sender 120. Sender selection is described in more detail below with regard to FIG. 5.

At step 505, the path/cloud manager 225 defines the other multicast-enabled content engines 145, 150, 155, 160 in multicast cloud A to be multicast receivers. In operation, the sender 120 acquires content from master 1 and then multicast transmits the content to the multicast receivers 145, 150, 155, 160.

At step 510, the path/cloud manager 225 provides an Internet Protocol address from a first set of IP addresses 300, IP address 1, to each of the plurality of multicast-enabled content engines 120, 145, 150, 155, 160 in multicast cloud A for multicast advertisement and multicast data traffic within multicast cloud A.

At step 515, the path/cloud manager 225 optionally provides an encryption key to each of the plurality of multicast-enabled content engines to secure data communication within the multicast cloud At step 520, the path/cloud manager 225 optionally selects one of the multicast receivers to be a secondary multicast sender. The secondary multicast sender is configured to propagate content in the multicast cloud if the multicast sender fails.

Figure 5:
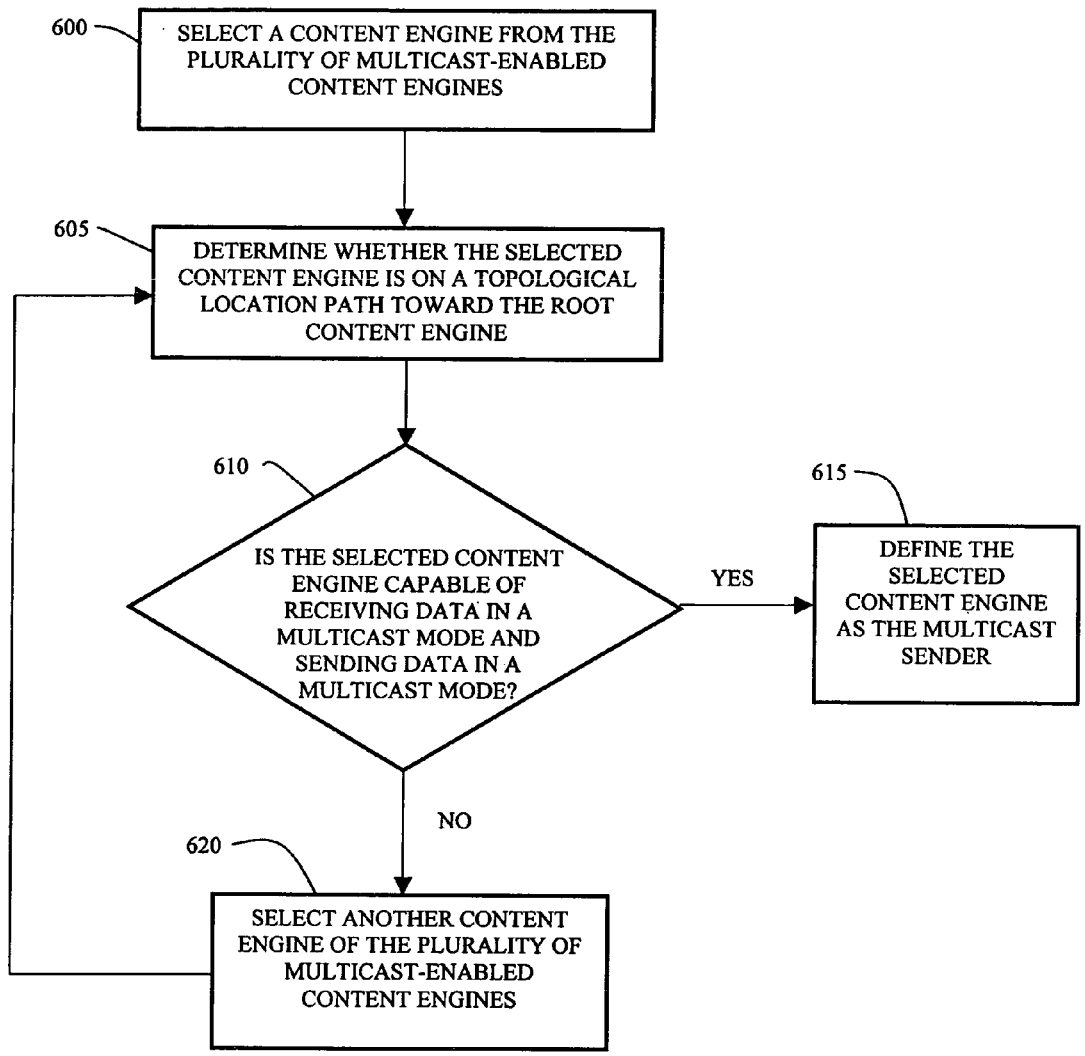
FIG. 5 is a flow chart of the process of selecting a multicast sender in the multicast clouds of FIG. 3.

FIG. 5 is a flow chart of the process of selecting a multicast sender in the multicast clouds of FIG. 3.

At step 600, the path/cloud manager 225 selects one of the content engines from the plurality of multicast-enabled content engines.

At step 605, the path/cloud manager 225 determines whether the selected content engine is on a topological location path toward the root content engine. The path/cloud manager 225 looks at the distribution hierarchy in making this determination.

At step 610, the path/cloud manager 225 determines whether the selected content engine is capable of receiving data in a multicast mode and sending data in a multicast mode.

At step 615, if the selected content engine is capable of receiving and transmitting data in a multicast mode, the path/cloud manager 225 defines the selected content engine as the multicast sender of the multicast group.

At step 620, if the selected content engine is not capable of receiving and transmitting data in multicast mode, the path/cloud manager 225 selects another content engine from the plurality of multicast-enabled content engines in the multicast group.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with an integrated unicast and multicast channel routing method that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with an integrated unicast and multicast channel routing device that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for establishing a data distribution path for content within a content distribution network, the method comprising the steps of:

receiving a network topology definition defining at least one hierarchical interconnection of network groups, each network group having at least one content engine, the network topology definition including information regarding the unicast capability and the multicast capability of content engines in the content distribution network;

receiving a channel definition including a selection of a plurality of content engines to distribute content within the content distribution network, the plurality of content engines in the channel definition selected from content engines within the network groups defined in the network topology definition;

detecting an assignment of a root content engine within the channel definition;

applying a first content distribution path determination technique to the network topology definition in relation to the channel definition to establish a set of unicast content distribution paths in the content distribution network for unicast distribution of content from the root content engine to the plurality of content engines defined in the channel definition; and applying a second content distribution path determination technique to the network topology definition in relation to the channel definition to establish a set of multicast content distribution paths in the content distribution network for multicast distribution of content in a subset of the plurality of content engines defined in the channel definition;

wherein the step of applying the second content distribution path determination technique further comprises the steps of:

at each network group having a plurality of multicast-enabled content engines included in the channel definition, establishing a multicast cloud by
a) selecting one of the plurality of multicast-enabled content engines to be a multicast sender;
b) defining the other multicast-enabled content engines of the plurality of multicast-enabled content engines to be multicast receivers; and
c) providing an Internet Protocol address to each of the plurality of multicast-enabled content engines for multicast advertisement and multicast data traffic within the multicast cloud;
wherein the step of selecting comprises the steps of:
i) selecting a content engine of the plurality of multicast-enabled content engines;
ii) determining whether the selected content engine is on a topological location path toward the root content engine;
iii) confirming that the selected content engine is capable of receiving data in a multicast mode and sending data in a multicast mode;
iv) if the selected content engine is on a topological location path toward the root content engine and is capable of receiving and sending data in multicast, then defining the selected content engine as the multicast sender;
v) if the selected content engine is not on a topological location path toward the root content engine and is not capable of receiving and sending data in multicast, then selecting another content engine of the plurality of multicast-enabled content engines and repeating steps i)-iv).

2. The method of claim 1 wherein the step of establishing a multicast cloud further comprises the step of d) providing an encryption key to each of the plurality of multicast-enabled content engines to secure data communication within the multicast cloud.

3. The method of claim 1, further comprising the steps of:
receiving a second channel definition including a selection of a second plurality of content engines to distribute second content within the content distribution network, the second plurality of content engines in the second channel definition selected from the content engines within the network groups defined in the network topology definition;
detecting an assignment of a second root content engine within the second channel definition;
applying a first content distribution path determination technique to the network topology definition in relation to the second channel definition to establish a second set of unicast content distribution paths in the content distribution network for unicast distribution of content from the second root content engine to the second plurality of content engines defined in the second channel definition; and
applying a second content distribution path determination technique to the network topology definition in relation to the second channel definition to establish a second set of multicast content distribution paths in the content distribution network for multicast distribution of content in a second subset of the second plurality of content engines defined in the second channel definition.

4. The method of claim 3 wherein the step of applying the second distribution path determination technique further comprises the steps of:

establishing a multicast cloud at each network group included in the second channel definition having a plurality of multicast-enabled content engines; and
if a multicast cloud included in the second channel definition is also included in another channel definition, providing the multicast cloud with a second Internet Protocol address for multicast communication of second content from the second channel definition.

5. The method of claim 1 further comprising the steps of:
monitoring the sets of unicast content distribution paths and multicast distribution paths in the content distribution network;
detecting a path failure in the sets of unicast content distribution paths and multicast distribution paths in the content distribution network; and
establishing an alternative path in response to detecting the path failure.

6. The method of claim 1, wherein:
receiving the channel definition including the selection of the plurality of content engines to distribute content within the content distribution network comprises:
receiving the selection of the plurality of content engines to distribute content within the content distribution network, the selection of the plurality of content engines defining a content channel of the content distribution network;
receiving a specification regarding the content to be carried in the content channel; and
receiving a selection of the root content engine of the plurality of content engines, the selected root content engine being associated with the defined content channel.

7. The method of claim 1, wherein providing the Internet Protocol address to each of the plurality of multicast-enabled content engines for multicast advertisement and multicast data traffic within the multicast cloud comprises providing a single multicast Internet Protocol address to the plurality of multicast-enabled content engines for multicast advertisement and multicast data traffic.

8. The method of claim 1, wherein applying the first content distribution path determination technique to the network topology definition in relation to the channel definition to establish the set of unicast content distribution paths in the content distribution network comprises: developing a data link from each non-root network group within a content channel back to the root content engine of the content channel.

9. The method of claim 1, wherein each of the plurality of multicast-enabled content engines included in the channel definition are multicast-enabled to listen for, transmit, and receive multicast data transmissions.

10. The method of claim 9, wherein each content engine within each of the network groups defined in the network topology definition has substantially equal connectivity to portions of the content delivery network external to the network group.

11. The method of claim 1, wherein
applying the first content distribution path determination technique to the network topology definition in relation to the channel definition to establish the set of unicast content distribution paths in the content distribution network for unicast distribution of content from the root content engine to the plurality of content engines defined in the channel definition comprises:
examining the network topology definition for unicast enabled content engines, and developing sets of unicast content distribution paths among the unicast enabled content engines within a channel based upon the network topology definition; and applying the second content distribution path determination technique to the network topology definition in relation to the channel definition to establish the set of multicast content distribution paths in the content distribution network for multicast distribution of content in the subset of the plurality of content engines defined in the channel definition comprises, following application of the first content distribution path determination technique to the network topology definition:

examining the network topology definition for multicast enabled content engines, and establishing multicast content distribution paths in the content distribution network based upon the network topology definition.

12. A content distribution network including multicast clouds, comprising:

a plurality of content engines, the plurality of content engines divided into topological locations; and a content distribution manager in communication with the plurality of content engines wherein the content distribution manager is configured to:

receive a network topology definition defining at least one hierarchical interconnection of network groups, each network group having at least one content engine, the network topology definition including information regarding one of the unicast capability and the multicast capability of content engines in the content distribution network;

receive a channel definition including a selection of a plurality of content engines to distribute content within the content distribution network, the plurality of content engines in the channel definition selected from content engines within the network groups defined in the network topology definition;

detect an assignment of a root content engine within the channel definition;

apply a first content distribution path determination technique to the network topology definition in relation to the channel definition to determine a set of unicast content distribution paths in the content distribution network for unicast distribution of content from the root content engine to the plurality of content engines defined in the channel definition; and apply a second content distribution path determination technique to the network topology definition in relation to the channel definition to determine a set of multicast content distribution paths in the content distribution network for multicast distribution of content in a subset of the plurality of content engines defined in the channel definition.

13. A computer program product having a computer-readable medium including computer program logic encoded thereon that, when performed on a computer system having a coupling of a memory, a processor, and at least one communications interface, provides a method for establishing a data distribution path for content within a content distribution network by performing the operations of:

receiving a network topology definition defining at least one hierarchical interconnection of network groups, each network group having at least one content engine, the network topology definition including information regarding one of the unicast capability and the multicast capability of content engines in the content distribution network;

receiving a channel definition including a selection of a plurality of content engines to distribute content within the content distribution network, the plurality of content engines in the channel definition selected from content engines within the network groups defined in the network topology definition;

detecting an assignment of a root content engine within the channel definition;

applying a first content distribution path determination technique to the network topology definition in relation to the channel definition to determine a set of unicast content distribution paths in the content distribution network for unicast distribution of content from the root content engine to the plurality of content engines defined in the channel definition; and applying a second content distribution path determination technique to the network topology definition in relation to the channel definition to determine a set of multicast content distribution paths in the content distribution network for multicast distribution of content in a subset of the plurality of content engines defined in the channel definition.

* * * * *